April 23, 1935.
J. F. GOETZ
1,999,045
SMOKE STACK CABLE FITTING
Filed April 6, 1933
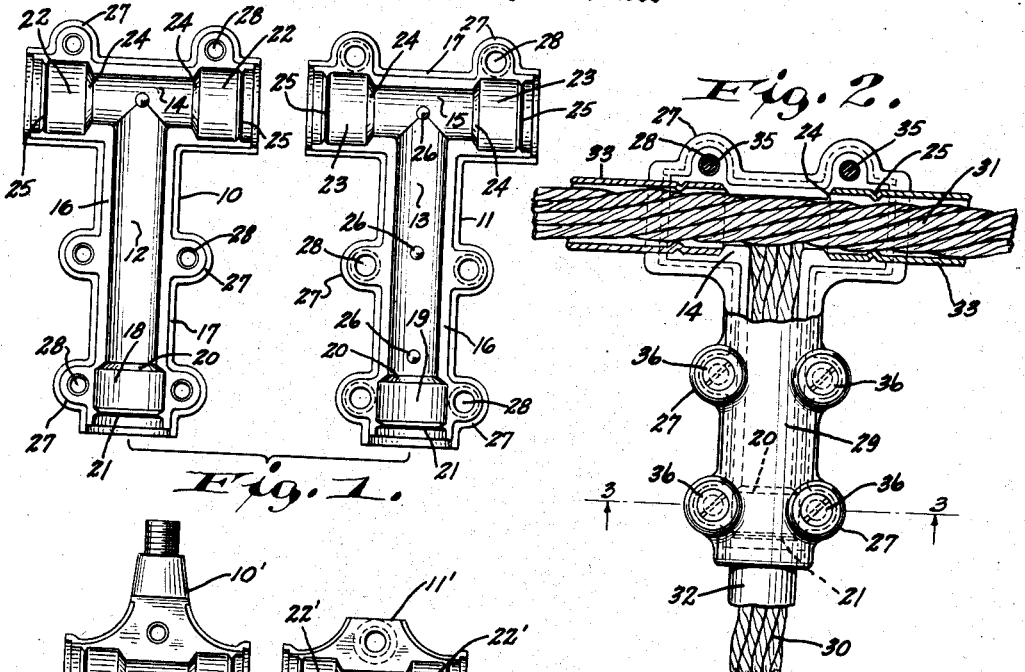
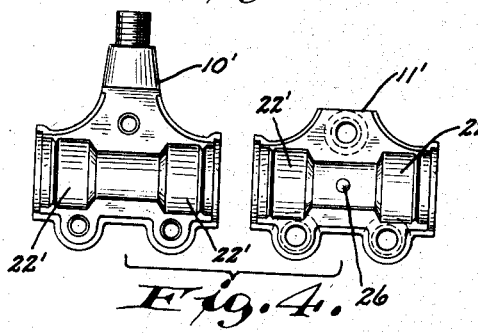
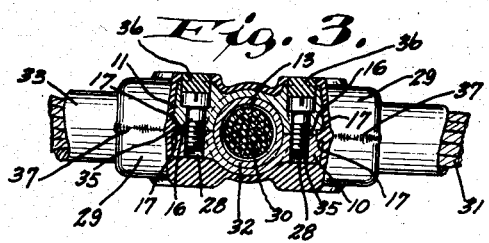
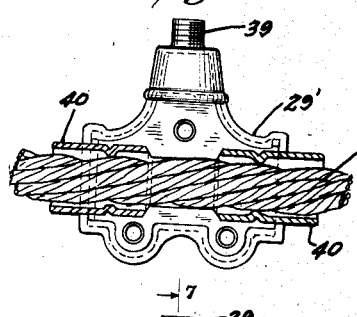
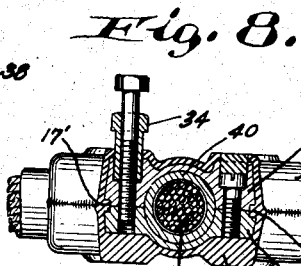
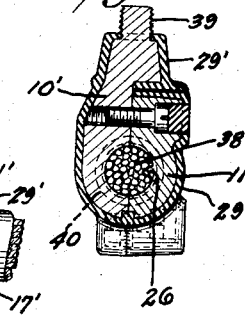
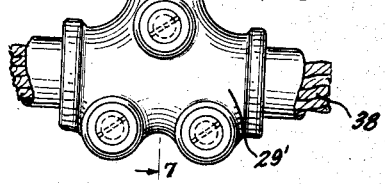
INVENTOR.
Julius F. Goetz,
BY Morsell, Lieber & Morsell
ATTORNEYS.

Patented Apr. 23, 1935

1,999,045

UNITED STATES PATENT OFFICE 1,999,045

SMOKE STACK CABLE FITTING

Julius F. Goetz, Hartford, Wis.

Application April 6, 1933, Serial No. 664,721

5 Claims. (Cl. 173—273)

This invention relates to improvements in smoke stack cable fittings.

It is highly desirable to have tall brick and concrete smoke stacks of industrial plants and large buildings equipped with lightning rods. The lightning rods are grounded by means of cables which extend from the rods downwardly along the stack and ultimately connect with ground fittings or connections. In these installations certain types of fittings are used for connecting the upper ends of the cable portions with the lightning rods, and other forms of metallic fittings are provided for spacedly supporting the cable with reference to the stack or chimney. In order to pass the fire underwriters' code, all of the fittings and cable portions from the top of the stack to at least twenty-five feet downwardly therefrom must be lead covered, and it is also essential that the joints between cables and fittings and complementary sections of the fittings be water and gas tight, for the reason that smoke from the stack will cause corrosion and deterioration of these members if they are not lead covered and if the joints are not water and gas tight.

The present invention is concerned with the various fittings and connections used for the lightning rod cable in the aforementioned twenty-five foot zone. Heretofore, of course, fittings of this type have been lead covered, but attempts thus far have not been entirely successful in the attainment of a tight bond or connection between the metal of the fittings and the lead jackets therefor.

It is, therefore, the primary object of the present invention to provide lead covered cable fittings constructed and arranged so that a positive and tight bond is provided between the lead and the metal of the fittings.

A further object of the invention is to provide lead covered cable fittings of the class described formed in complementary half sections, means being provided for drawing the sections together in cable embracing relationship and for insuring a gas and water tight joint between the sections and the lead jackets therefor.

A further object of the invention is to provide lead jacketed smoke stack cable fittings which are relatively inexpensive, which are strong and durable, which will meet all code requirements for the type of fittings, and which are well adapted for the purposes described.

With the above and other objects in view, the invention consists of the improved smoke stack cable fittings, and their parts and combinations as set forth in the claims, and all equivalents thereof.

In the accompanying drawing in which the same reference characters indicate the same parts in all of the views:

Fig. 1 is a developed view of two complementary sections of one form of metallic cable fitting known as a T-joint and prior to the application thereto of lead jackets;

Fig. 2 is a plan view of said fitting in its finished and cable embracing condition, parts being broken away and in section to show details of construction;

Fig. 3 is a cross-sectional view taken on line 3—3 of Fig. 2;

Fig. 4 is a developed view of two complementary sections of another form of metallic cable fitting known as a T-joint and prior to the application thereto of lead jackets;

Fig. 5 is a view of one of the sections thereof with its lead enclosing jacket and with a cable lodged within said section, said view also showing lead coverings for portions of the cable and the manner in which said coverings are lodged within the section;

Fig. 6 is an outside view of the completed fitting, the same being lead jacketed and engaging a cable;

Fig. 7 is a sectional view taken on line 7—7 of Fig. 6; and

Fig. 8 is a sectional view at right angles to Fig. 7 and showing the using of a draw bolt for preliminary drawing together of the complementary sections.

Referring now more particularly to the drawing, it will appear that the fitting illustrated in Figs. 1, 2 and 3 comprises two complementary metallic half sections 10 and 11 which are T-shaped in contour. Said sections are also of concave shape in cross-section and the long arms of both of the same are provided with complementary semi-circular grooves 12 and 13, while the short arms of the same are formed with similar complementary semi-circular grooves 14 and 15. The peripheral portions of both sections are formed with flat engaging surfaces 16, and exteriorly of said engaging surfaces the sections are further formed with right angular annular shoulders or ledges 17. The outer ends of the grooves 12 and 13 are formed with enlarged recesses 18 and 19 having beveled inner end portions 20 and ribs 21 near the other ends of the enlargements. Similarly, the end portions of the grooves 14 and 15 are formed with pairs of enlargements 22 and 23 respectively. The inner ends of the enlargements are beveled, as at 24, while adjacent their outer ends there are ribs 25. One of the sections, as 11, is formed within its longitudinal groove with inwardly projecting pointed prongs 26. Both sections are formed with laterally projecting mating or complementary lug portions 27, said lug portions having tapped openings 28 therein.

Each of the complementary metallic sections 10 and 11 has die cast or otherwise secured on its outer surface a lead semi-jacket 29. As shown most clearly in Fig. 3, each lead jacket is of a substantial thickness and a very important aspect of the invention is that the lead jacket extends into the annular shoulder or ledge 17 of its section. This serves to secure or bond the jacket to the section.

The T-joint, formed of two lead jacketed complementary sections 10 and 11, is adapted to connect one end of a cable 30 with an intermediate portion of a cable 31 at right angles thereto. Inasmuch as said cables are to electrically connect with each other, the major portions of the same within the fitting have portions of their lead jackets removed. A lead jacket for the cable 30 is designated by the numeral 32 and a similar lead jacket for the cable 31 is designated by the numeral 33. In utilizing the T-joint fitting the cable 31 is first laid into the groove 14 of the section 10, and the cable 30 is laid into the groove 12 of said section in such a manner that the free end of the cable 30 engages an intermediate portion of the cable 31. The portion of the cable jacket 33 between the enlargements 22—22 is cut away and the portion of the cable jacket 32 inwardly from the groove enlargement 18 is also cut away so that the covered portions of the cables are all received by said groove enlargements.

The next step in assembly is placing the section 11 over the section 10 in cable enclosing relationship. To draw the sections together and to squeeze the peripheral portions of the lead jackets of the sections together a draw bolt 34 (see Fig. 8) is utilized. This draw bolt is screwed into each pair of registering tapped openings of the lugs 27 and is then removed and then bolts 35 are turned tightly into said openings to secure the sections together. The spaces above the heads of the bolts, after the same are in place, are filled with lead plugs or fillers 36 driven thereinto.

Due to the fact that the complementary sections are drawn together very tightly, and due to the fact that the lead of the jackets is somewhat malleable, a bond and gas and water tight joint can be effected between the sections. If necessary, a hammer may be applied to the lead at the joint, as at 37, and it will also be noted from Fig. 3 that when the two sections are together the complementary edge ledges 17 form a peripheral U-shaped recess into which the lead of the jacket extends and insures a tight bond and union between the sections and the jackets.

When the sections are bolted together the lead covered portions 32 and 33 of the cables become tightly pressed and molded into the enlargements 18, 19, 22 and 23 and slippage of the cables and the lead tubing is prevented by the ribs 21 and 25 which bite into and crimp the cable jackets, as best shown in Fig. 2. This arrangement insures a complete seal at the ends of the fitting and around the cables. The prongs 26 project into the cable and aid in maintaining it in position.

In Figs. 4 to 8 inclusive there is illustrated another form of cable fitting known as a T-joint. The two complementary sections 10' and 11' thereof are shaped as shown. This fitting is formed in the same manner as the fitting previously described in detail, but is adapted to carry but a single cable 38 and is adapted to have its stud portion 39 secured into an air terminal. The covering portions 40 of the cable are tightly held within groove enlargements 22' and both sections of the fitting have lead jackets 29' which extend into the annular groove 17'.

It is obvious that in a lightning rod and cable installation for stacks and chimneys, a large number of different styles of fittings are utilized for various necessary connections and supports. Only two of such styles have been here illustrated and described, but it should be understood that the invention is applicable to the various forms of fittings which might be required and utilized.

From the foregoing description it will be seen that the improved smoke stack cable fittings are especially adapted for use in the zone wherein lead jackets are required, and the construction of the fittings is such that a tight and permanent bond between the metal of the fittings and the lead jackets is effected. The joints in the fittings are absolutely gas and water tight and the fittings will not deteriorate nor can fluid get access to the interiors thereof. The fittings are, furthermore, of simple and novel construction, and are well adapted for the purposes set forth.

What is claimed as the invention is:

1. A fitting for carrying electrical cables, comprising a pair of grooved, complementary, metallic sections having continuous, exteriorly opening, peripheral recesses, lead jackets covering said sections and extending into and filling said peripheral recesses, and means for tightly securing said sections together and compressing the jackets at their junctures and into said recesses.

2. A fitting for carrying electrical cables, comprising a pair of grooved, complementary, metallic sections having continuous, exteriorly opening peripheral recesses, lead jackets covering the outer surfaces of said sections and having continuous, inturned edge flanges extending into and filling said recesses, and means for tightly securing said sections together and compressing the jackets at their junctures and into said recesses.

3. A fitting for carrying electrical cables, comprising a pair of grooved, complementary, metallic sections having continuous, mating peripheral, exteriorly opening recesses, malleable lead jackets covering the outer surfaces of said sections and having continuous, inturned edge flanges extending into and filling said recesses, and means for clamping said sections together.

4. In combination, an electrical cable fitting comprising a pair of grooved, complementary sections having continuous, exteriorly opening, peripheral recesses, means for securing said sections together with the grooves forming an opening through said fitting, an electrical cable extending through said opening and clamped between said sections, means for sealing the ends of said opening around the cable, and lead jacket sections covering the fitting sections and having an inturned annular flange extending into and filling said peripheral recesses.

5. In combination, an electrical cable fitting comprising a pair of grooved, complementary sections having continuous, exteriorly opening, peripheral recesses, means for securing said sections together with the grooves forming an opening through said fitting, an electrical cable extending into the fitting and within said opening, a lead jacket surrounding a portion of the cable and lodged within and sealing an end of the opening, and lead jacket sections covering the fitting sections and having an inturned annular flange extending into and filling said peripheral recesses.

JULIUS F. GOETZ.